Patented Apr. 6, 1937

2,075,976

UNITED STATES PATENT OFFICE 2,075,976

PREVENTION OF CORROSION

William S. Calcott, Penns Grove, N. J., assignor to E. I. du Pont de Nemours & Company, Wilmington, Del., a corporation of Delaware No Drawing. Application September 7, 1933, Serial No. 688,463

6 Claims. (Cl. 23—2)

This invention relates to the inhibition of corrosion and more particularly to the inhibition of corrosion of ferrous materials subject to attack by water containing carbon dioxide, oxygen, and sulfur or hydrogen sulfide in the form of mixtures or compounds of the same.

In the purification and recovery of waste water from gas scrubbing processes, the original gas containing as impurities various mixtures and compounds of carbon dioxide, oxygen, and sulfur, which are removed by the water in the scrubbing process, it has been found that apparatus used for handling of such waste water is considerably corroded if constructed of ferrous materials.

It is an object of the present invention to overcome or at least to reduce the corrosive action of the said waste water and similar aqueous liquids upon ferrous materials.

Other objects and advantages of the invention will be apparent by reference to the following specification wherein its preferred details and embodiments are described.

I have found that the corrosive effect upon ferrous materials of water utilized for scrubbing uncarburetted water gas and the like, and containing carbon dioxide, oxygen, and sulfur, or mixtures of, or compounds containing the same, may be substantially reduced or inhibited by adding casein thereto.

Relatively small concentrations of casein in the waste water are sufficient substantially to reduce the corrosive effect of the deleterious impurities. Thus, for example, I have found that a casein concentration of approximately 0.004–0.007% by weight is sufficient to reduce corrosion by about 50%.

I have found that it is advantageous to increase the solubility of casein in water by hydrolyzing the same such, for example, as by treatment thereof with caustic, before its utilization. Thus, for example, I have found that sodium hydroxide added to the extent of about 8 grams per pound of casein and boiled slowly until the casein is dissolved will give a casein which is admirably suited for corrosion inhibition. Such a hydrolyzed casein, when added in about 0.02% concentration, to water containing carbon dioxide, oxygen, and sulfur reduced the corrosion rate of ferrous materials approximately 70% as compared with the corrosion noted in the case of water containing no inhibitor. A further advantage of this invention lies in the decided clarification which is accomplished in the recirculated water by casein addition. The acidity of various grades of casein varies somewhat, however, and the ratio of caustic to casein described must not be taken as limiting, for greater as well as smaller amounts may be used dependent upon the acidity of the casein employed.

Altho the invention is subject to wide variation in proportions of materials used as well as in details of operation, the following example will illustrate how the invention may be practiced.

*Example.*—Approximately 1.5 pounds of solid sodium hydroxide or about 4% of the weight of casein, was added to 35 pounds of Argentine casein and the resulting mixture agitated, with direct steam addition, and boiled for one and three-quarter hours. Sufficient water was added to make the total quantity of liquid 310 gallons and the agitator and steam addition stopped.

The casein solution thus prepared was injected into waste water coming from the scrubbing, under 400 pounds per square inch pressure, of uncarburetted water gas, containing carbon dioxide, oxygen, and sulfur or compounds of the same. The casein solution was injected in amounts sufficient to maintain a concentration of about 0.004% by weight in said waste water while it was circulating in a recovery system consisting essentially of a forced draught cooling tower of standard design placed at a level above the scrubbing process, whereby a large portion of the required hydrostatic head could be recovered as well as dissolved impurities removed and the regenerated water used for further scrubbing. Whereas the corrosion of ferrous materials in such a system progressed at the rate of 0.020 inch per year in the absence of casein, the corrosion was reduced to 0.011 inch per year by the addition of casein as above described.

Various changes may be made in the details and methods of operation of this invention without departing therefrom or sacrificing any of the advantages thereof.

I claim:

1. The method of reducing corrosion of ferrous materials subject to attack by water containing carbon dioxide, oxygen, and combined sulfur which comprises maintaining a small concentration of caustic treated casein therein.

2. The method of reducing corrosion of ferrous materials by water containing carbon dioxide, oxygen and combined sulfur, in systems for purifying waste water from uncarburetted water gas scrubbing operations, which comprises adding hydrolyzed casein to said water and maintaining a concentration of about 0.004% hydrolyzed casein in said water.

3. In a circulatory process for removing carbon dioxide, sulfur compounds, and other impurities from gaseous mixtures containing the same by water scrubbing and regenerating the scrubbing water for further use, the step of reducing corrosion of ferrous metal parts with which the circulating water contacts which comprises maintaining a small concentration of caustic treated casein in said water.

4. In a circulatory process for removing carbon dioxide, sulfur compounds, and other impurities from gaseous mixtures containing the same by water scrubbing and regenerating the scrubbing water for further use, the step of reducing corrosion of ferrous metal parts with which the circulating water contacts which comprises maintaining a concentration of about 0.004% hydrolyzed casein in said water.

5. The method of reducing corrosion of ferrous materials by water containing carbon dioxide, oxygen, and combined sulfur, which comprises maintaining a small concentration of hydrolyzed casein therein.

6. The method of reducing corrosion of ferrous materials by water containing carbon dioxide, oxygen, and combined sulfur in systems for purifying waste water from uncarburated water gas scrubbing operations which comprises maintaining a small concentration of hydrolyzed casein therein.

WILLIAM S. CALCOTT.